(12) United States Patent
Sakai et al.

(10) Patent No.: US 6,556,464 B2
(45) Date of Patent: Apr. 29, 2003

(54) PWM CONVERTER SYSTEM

(75) Inventors: Keijirou Sakai, Kanasago (JP); Toshiaki Okuyama, Tokai (JP); Kinya Nakatsu, Hitachi (JP); Seiji Ishida, Hitachi (JP); Hiroshi Fujii, Chiba (JP); Junji Kato, Takaishi (JP); Masahiro Hiraga, Yotsukaido (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/956,257

(22) Filed: Sep. 20, 2001

(65) Prior Publication Data

US 2002/0154526 A1 Oct. 24, 2002

(30) Foreign Application Priority Data

Apr. 18, 2001 (JP) ........................................ 2001-119000

(51) Int. Cl.$^7$ ...................... H02M 7/5387; H02M 7/44; H02M 3/22
(52) U.S. Cl. .............................. 363/132; 363/98; 363/17
(58) Field of Search .......................... 363/132, 98, 127, 363/89, 15, 17, 95, 37, 41

(56) References Cited

U.S. PATENT DOCUMENTS 4,685,042 A * 8/1987 Severinsky .................. 363/34
5,155,671 A * 10/1992 Inaba et al. .................... 363/37
5,625,539 A * 4/1997 Nakata et al. ................. 363/17

FOREIGN PATENT DOCUMENTS

| JP | 6153526 | 5/1994 |
| JP | 7213067 | 8/1995 |

* cited by examiner

Primary Examiner—Rajnikant B. Patel
(74) Attorney, Agent, or Firm—Crowell & Moring LLP (57) ABSTRACT

A single-phase PWM converter system in accordance with the present invention employs a sample-and-hold circuit which samples and holds a direct current in the state wherein one of two-phase gate signals of a positive or negative side arm is ON and the other phase is OFF, determines the sign of an output of the sample-and-hold circuit according to the two-phase gate condition, detects a phase current at the input side of the converter, and controls a voltage at the input side of the converter so that the detected current value agrees with a power supply current command.

Further, a three-phase PWM converter system in accordance with the present invention detects the effective current and the ineffective current of the power supply current from the direct current, and based on the values, controls the PWM converter so that the sine wave power supply current whose power supply power factor is 1 is provided.

11 Claims, 13 Drawing Sheets

PWM CONVERTER SYSTEM

BACKGROUND OF THE INVENTION

1. Field of the Invention

The present invention relates to a PWM converter system having a function to provide the sine wave power supply current whose power supply power factor is nearly 1 to supply electric power from the power source side to the load side or regenerate electric power from the load side to the power source side.

2. Related Background Art

A sine wave PWM converter has been popular as a power converter that greatly reduces harmonic currents generated by a power converter. The PWM converter is connected to an input side AC (Alternating Current) power source via an AC reactor or a transformer, and a smoothing capacitor and a load are connected between DC (Direct Current) terminals located on the converter's output side. Therefore, the PWM converter is controlled so that the sine wave power supply current (i.e. AC reactor current) which has the same phase as the power supply voltage is provided during the loading state when electric power is supplied from the power source side to the load side.

On the other hand, as seen in a solar power generating device, when electric power is regenerated from the battery side (i.e. DC power source side) to the AC power source side, a converter is controlled so that the sine wave power supply current whose phase is reverse to that of the power supply voltage is provided. Specifically, a power supply current amplitude command, which is a current command whose phase is the same as that of a power supply voltage, is provided to make the DC voltage of a smoothing capacitor become constant and thus the PWM converter is controlled so that the detected value of the power supply current agrees with the command.

As described above, a current sensor is required to detect an input alternating current of a converter. For example, as disclosed in Japanese Application Patent Laid-Open Publication No. 07-213067, at least two current sensors are required when a three-phase converter is used and one current sensor is necessary when a single-phase converter is used. Further, if a positive or negative arm switching element of a converter short-circuits, a voltage of a smoothing capacitor also short-circuits causing an overcurrent, which results in damaging the switching element. Therefore, in order to protect the switching element, a direct current sensor is placed between the output side of the converter and the smoothing capacitor to detect overcurrent and block gate signals.

Furthermore, as the relevant art, Japanese Application Patent Laid-Open Publication No. 06-153526 has disclosed a method of detecting a three-phase alternating current from a direct current of a three-phase inverter so as to make the AC side current sensor of the three-phase inverter unnecessary.

In a conventional PWM converter system, two current sensors are required on the converter's alternating current input side and one on the direct current output side when a three-phase PWM converter is used, and one current sensor is required on the input side and one on the output side when a single-phase PWM converter is used.

Further, the art disclosed in Japanese Application Patent Laid-Open Publication No. 06-153526 requires a high-speed A/D converter or a microprocessor.

SUMMARY OF THE INVENTION

The main object of the present invention is to provide a PWM converter system which controls a converter without requiring the current sensor at the input side of the converter and performs the control equivalent to a converter system with the current sensor, resulting in reducing the overall cost and the size of the converter system.

A PWM converter system in accordance with the present invention comprises current detecting means which detects an input current of a converter from a direct current at the output side of the converter and the gate signal of the converter, and a computing unit which controls a power supply current of the converter based on the detected current. Accordingly, the PWM converter system controls the converter without requiring the current sensor at the input side of the converter and performs the control equivalent to a converter system with the current sensor attached to it.

A single-phase PWM converter system in accordance with the present invention, which is connected to a single-phase AC power source, employs a sample-and-hold circuit, as current detecting means, which samples and holds a direct current in the state wherein one of two-phase gate signals of a positive or negative side arm is ON and the other phase is OFF; determines the sign of an output of the sample-and-hold circuit according to the two-phase gate condition; and detects an input current of a converter. Furthermore, the PWM converter system employs means for controlling an input voltage of a converter so that the detected current value agrees with a current command. This enables the PWM converter system to perform the control equivalent to a PWM converter system with the current sensor attached to it. Moreover, the signal waveform output from the sample-and-hold circuit has a period of 180 degrees of a converter's input-side AC voltage and continuously changes in synchronization with a power supply current.

Further, a PWM converter system in accordance with the present invention blocks all gate signals of a converter when an output of the sample-and-hold circuit exceeds a predetermined overcurrent level. Accordingly, when an overcurrent occurs due to overload or some other reasons, the PWM converter system can be protected quickly.

Next, a current detecting part of a three-phase PWM converter system in accordance with the present invention, which is connected to a three-phase AC power source, comprises a first sample-and-hold circuit which samples and holds a direct current in the state wherein one of three phases of a positive or negative side arm switching element of the three-phase PWM converter system is ON and the other two phases are OFF, and a second sample-and-hold circuit which samples and holds a direct current in the state wherein two phases are ON and the other phase is OFF.

Further, a three-phase PWM converter system in accordance with the present invention employs means for calculating an effective current Iq and a ineffective current Id of a power supply current based on the output of said two sample-and-hold circuits and the detected value of the power supply voltage phase. This makes it possible to control an alternating current input voltage of the converter in response to the calculated values of Iq and Id. Consequently, it is possible to perform the control of active and ineffective currents without using the current sensor at the input side of the converter, which is equivalent to the control by a similar PWM converter system with the sensor.

Furthermore, a three-phase PWM converter system in accordance with the present invention blocks all gate signals of the converter when at least one output from a first or second sample-and-hold circuit exceeds a predetermined overcurrent level. As a consequence, the converter system can quickly be protected from overcurrent due to overload or some other reasons.

DETAILED DESCRIPTION OF PREFERRED EMBODIMENTS

Preferred embodiments of the present invention will be described in detail below referring to drawings.

Embodiment 1

Figure 1:
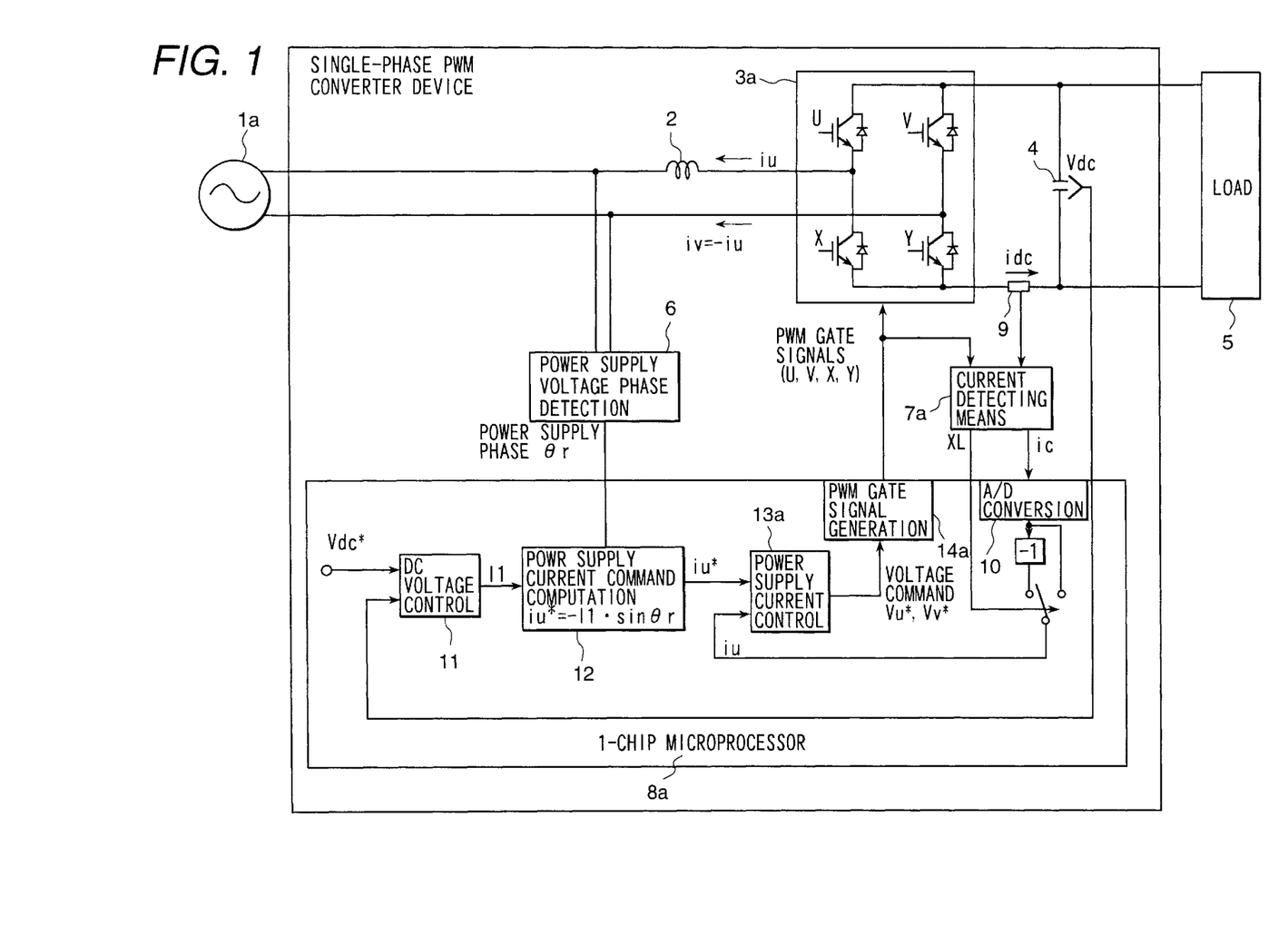
FIG. 1 is a schematic diagram that illustrates a single-phase PWM converter system which is a first embodiment of the present invention.

In FIG. 1, the alternating current power, which is supplied to a single-phase converter 3a from a single-phase AC power source 1a via an AC reactor 2, is converted into the direct current power by a single-phase converter 3a and supplied to a smoothing capacitor 4 and a load 5. Further, a control circuit is comprised of power supply voltage phase detecting means 6, single-phase current detecting means 7a, and a converter control computing unit 8a consisting of a one-chip microprocessor. The power supply voltage phase detecting means 6 detects a voltage phase θr of a power source 1a. Next, the single-phase current detecting means 7a samples a direct current based on the gate signal and an output of a direct current detector 9, detects the input current waveform of the converter, and outputs the value as ic.

Next, the converter control computing unit 8a conducts processing by means of software of a one-chip microprocessor. First, it inputs a value ic output by the current detecting part by using an A/D converter built in the microprocessor, assigns the sign to ic based on a gate signal XL of the X phase, and calculates an input current iu of the converter. In a converter controller, which employs a commonly used technique, DC voltage control means 11 outputs an amplitude command I1 of a power supply current (i.e. input current of a converter) so that the detected DC voltage value Vdc agrees with a DC voltage command Vdc*, and then a power supply current command computing unit 12 calculates Equation 1 to output an alternating current command iu*.

$$iu^* = -I1 \cdot \sin \theta r \qquad \text{<Equation 1>}$$

Here, I1 becomes positive when electric power is supplied to the load side from the power source, and the phase of iu* becomes reverse to that of a power supply voltage phase θr. On the other hand, I1 becomes negative when electric power is regenerated from the load side to the power source side, and the phase of iu* becomes the same as that of a power supply voltage phase θr. Next, power supply current control means 13a outputs two-phase voltage commands Vu* and Vv* (i.e. Vv* equals -Vu*) so that the detected value iu agrees with an alternating current command iu*, and based on this, PWM gate signal generating means 14a outputs gate signals U, V, X, and Y.

Figure 2:
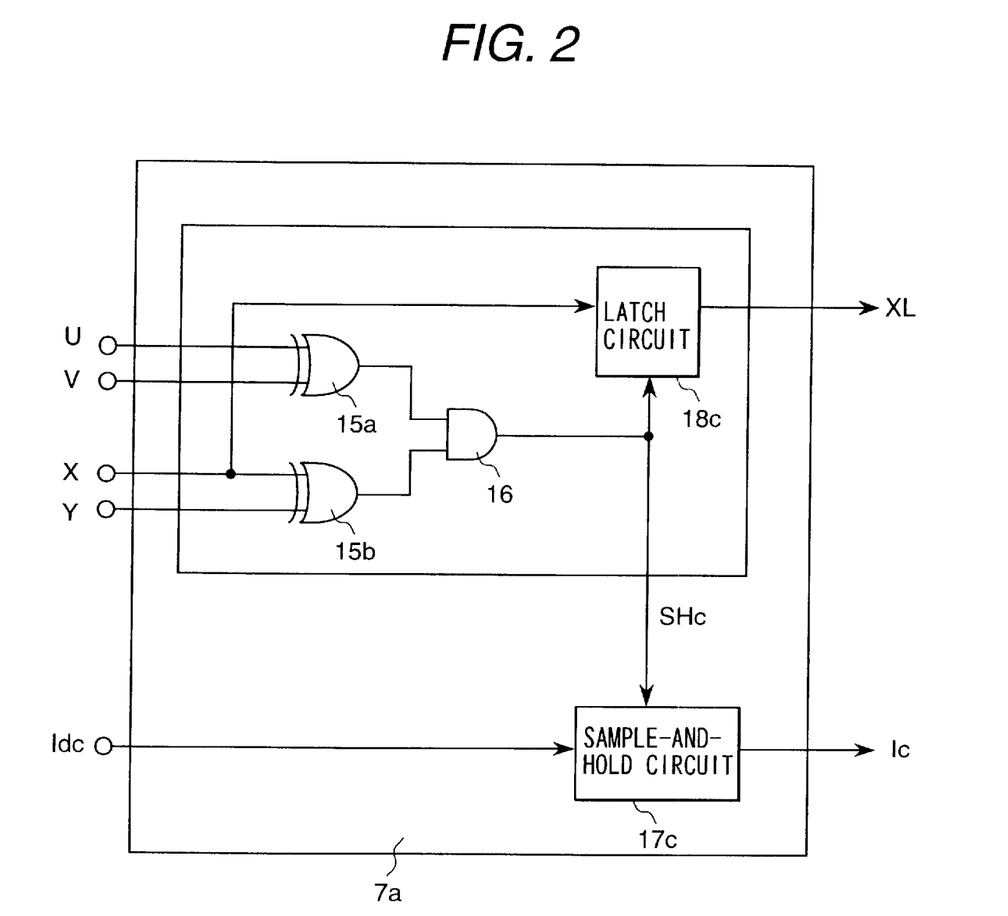
FIG. 2 is a detailed circuit diagram of current detecting means 7a shown in FIG. 1.

FIG. 2 shows a detailed circuit diagram of single-phase current detecting means 7a which is the main part of the present invention. The logical product of an output of the converter's positive arm gate signals U and V via an exclusive-OR circuit 15a and an output of negative arm gate signals X and Y via an exclusive-OR circuit 15b is obtained, and the output is regarded as a sample-and-hold signal SHc of a sample-and-hold circuit 17C. Further, in a latch circuit 18c, a gate signal X is latched in the state where SHc equals 1, and is regarded as an XL signal.

Figure 3:
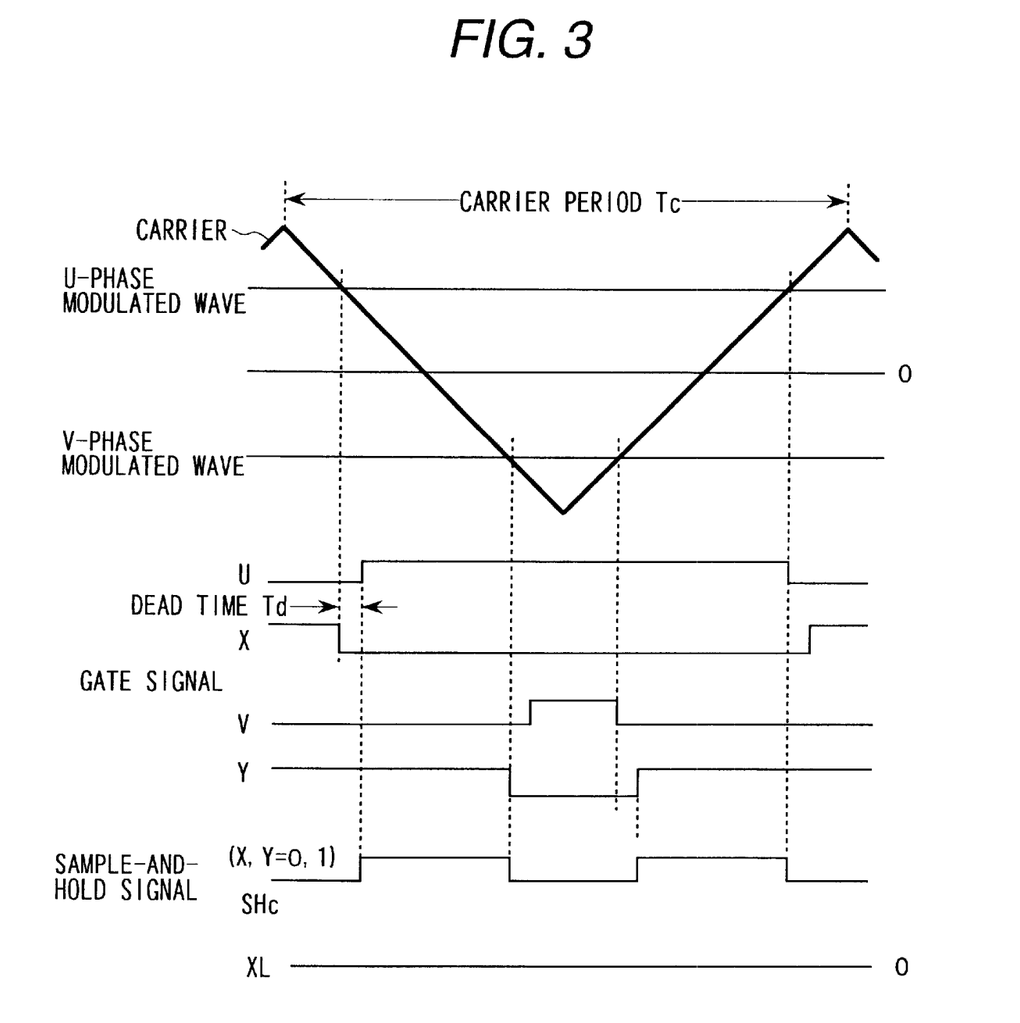
FIG. 3 is a timing chart of current detecting means 7a shown in FIG. 2.

Next, FIG. 3 is a timing chart of single-phase current detecting means 7a shown in FIG. 2. U-phase and V-phase modulated waves correspond to each voltage command. A V-phase modulated wave is 180 degrees out of phase with a U-phase modulated wave, that is, an inverted sign value of the U-phase modulated wave. FIG. 3 shows the operational waveform of each part during a carrier period when the U-phase modulated wave is positive and the V-phase modulated wave is negative. A gate signal becomes 1 when a modulated wave is larger than a triangular wave, and a switching element that associates with the gate signal turns on. On the other hand, a gate signal becomes 0 (zero) when a modulated wave is smaller than a triangular wave, and a switching element that associates with the gate signal turns off. A sample-and-hold signal SHc becomes level 1 in a section where signals U and V are different excluding the dead time section, and a direct current idc is sampled and held in this section. Further, the sign of ic is identified by an XL signal that is an output of the X signal latched in this section.

Figure 4:
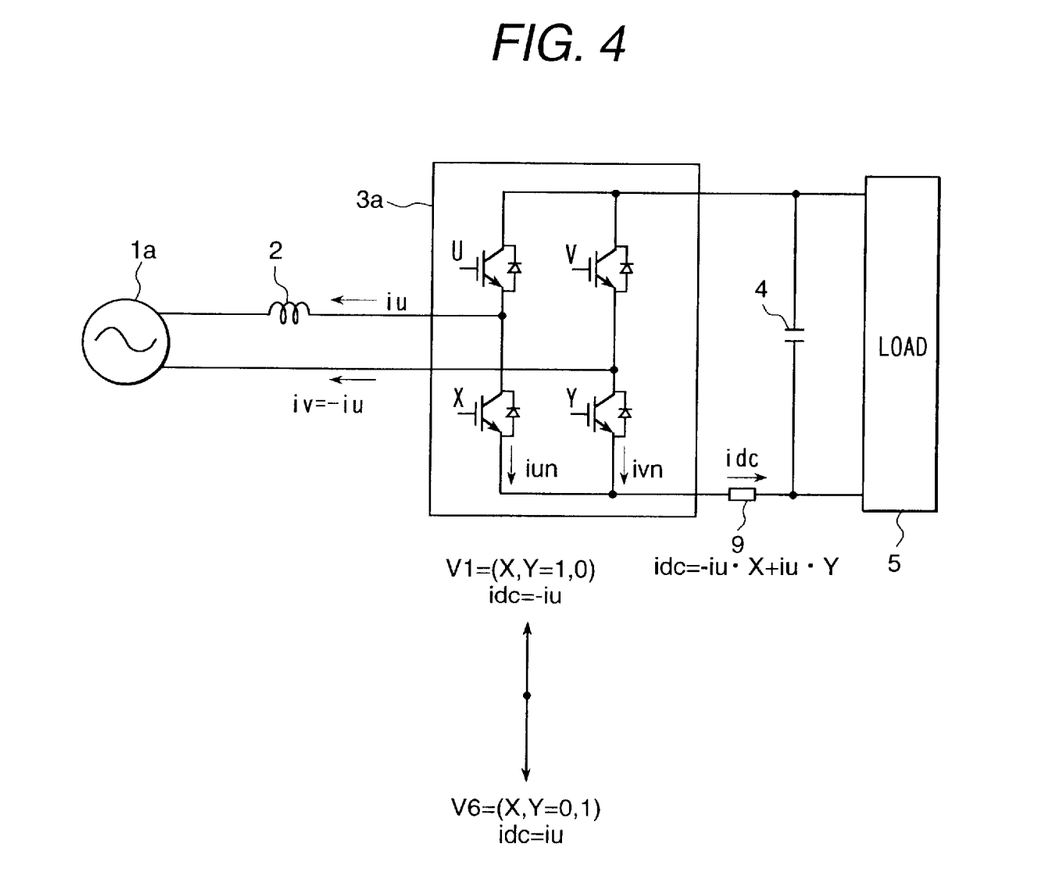
FIG. 4 is an explanatory drawing that shows the relationship between a direct current at the output side of a single-phase converter and an alternating current at the input side of a single-phase converter.

Now, power supply current components contained in a direct current idc will be explained with reference to FIG. 4. A single-phase inverter 3a consists of four switching elements and four diodes, wherein gate signals of the positive arm are U and V and gate signals of the negative arm are X and Y. A direct current idc is expressed by Equation 2 according to FIG. 4.

$$idc = iun + ivn = -iu \cdot X - iv \cdot Y \qquad \text{<Equation 2>}$$

where iun is 0 when X equals 0 and is -iu when X equals 1. Similarly, ivn is 0 when Y equals 0 and is -iv when Y equals 1. Further, iu equals -iv, and in the section where a sample-and-hold signal SHc is output, Y always equals 0 when X equals 1, and Y equals 1 when X equals 0. Accordingly, in Equation 2, iu equals −idc when X equals 1 and iu equals idc when X equals 0. Accordingly, it is possible to detect a phase current iu at the input side of the converter by detecting a direct current idc (i.e., ic equals idc) in the section of the sample-and-hold signal SHc, as shown in FIG. 1, identifying the gate signal X (i.e., XL equals X) at that time, and assigning the sign to ic.

Figure 5:
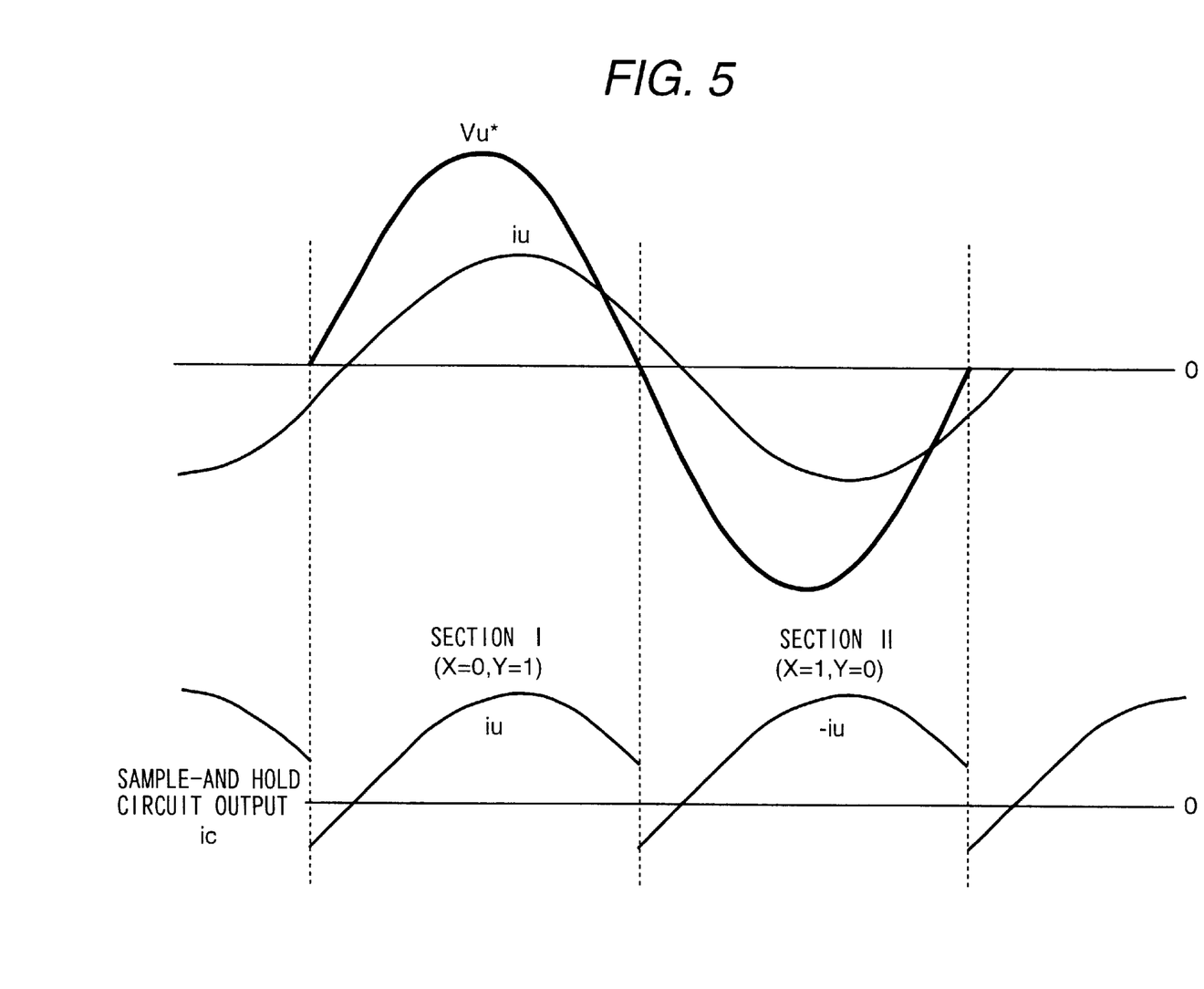
FIG. 5 is an output waveform chart of a sample-and-hold circuit 17c shown in FIG. 2.

Next, the waveform of an output ic of a sample-and-hold circuit 17c is shown in FIG. 5. In Section I, a U-phase voltage command Vu* is positive and a V-phase voltage command Vv* is negative. In this section, idc is sampled and held in the same sate as shown in FIG. 3 (i.e. X equals 0, Y equals 1), resulting in ic being equal to iu (i.e. equal to idc). On the other hand, in Section II, a U-phase voltage command Vu* is negative and a V-phase voltage command Vv* is positive. In this section, idc is sampled and held in the sate where X equals 1, and Y equals 0, resulting in ic being equal to −iu (i.e. equal to idc). As a result, the waveform of ic is continuously output with a period of 180 degrees in synchronization with an input current of a converter.

This embodiment detects an input current of a converter by using an output value idc of a direct current sensor mounted for protecting the converter's arm from short-circuiting thereby controlling a current of the converter. Consequently, a power supply current sensor is not required, which reduces the cost and the size of the converter system.

Further, an instantaneous value of the power supply current is continuously output from a sample-and-hold circuit as shown in FIG. 5. Therefore, when an ic value exceeds a predetermined overcurrent level due to overload or some other reasons, this embodiment blocks all gate signals of the converter and functions as a diode rectifier. Furthermore, it sends an overcurrent signal to the load side to stop operation thereof. For example, when a motor driving inverter is connected as a load, this embodiment blocks gate signals of the inverter to stop operation. Consequently, when an overcurrent occurs due to overload or some other reasons, it is possible to quickly protect the converter system and load side devices.

Embodiment 2

Figure 6:
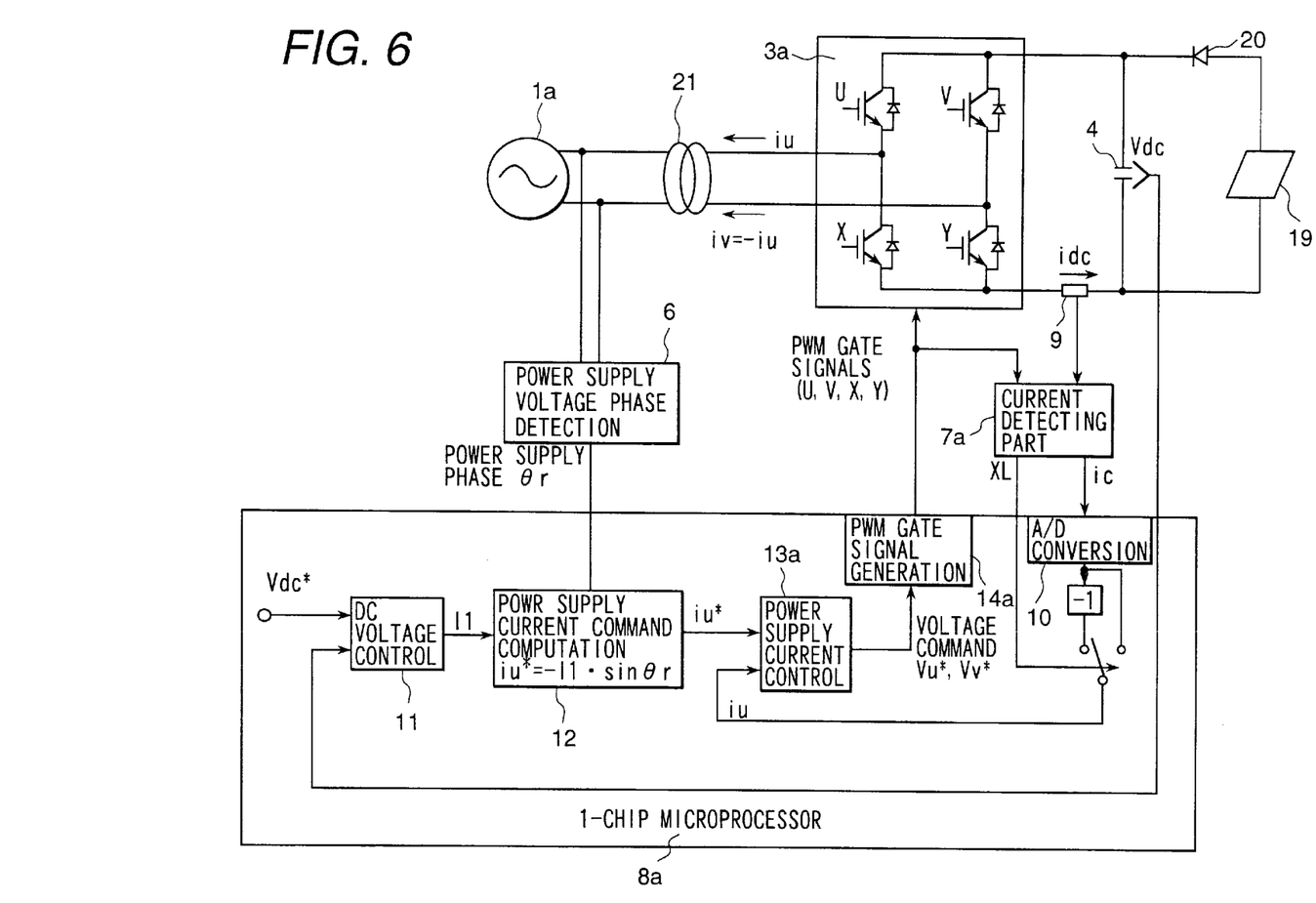
FIG. 6 is a solar power generating device which is another embodiment of the present invention.

FIG. 6 shows a second embodiment of the present invention. FIG. 6 illustrates a solar power generating device wherein the main circuit is different from a main circuit shown in FIG. 1. The main circuit consists of a solar battery 19 and a clamping diode 20 instead of a load 5, wherein electric power on the DC side is regenerated to the AC power source side. Further, a transformer 21, which is used instead of an AC reactor, insulates the power source from the converter. A single-phase PWM converter control technique employed in this embodiment is the same technique as a first embodiment. Accordingly, a power supply current sensor is not required, reducing the cost and the size of the device.

Embodiment 3

Figure 7:
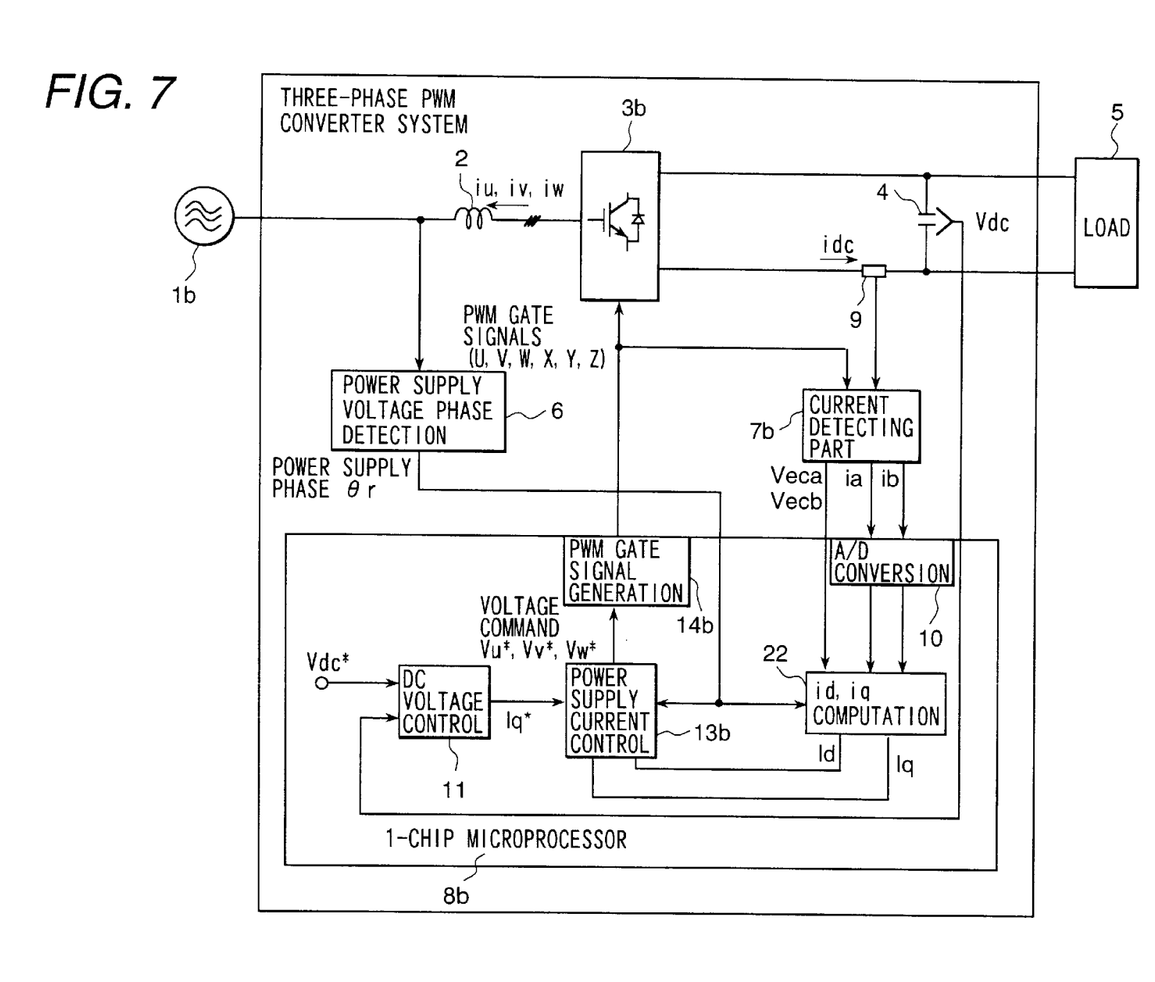
FIG. 7 is a schematic diagram that illustrates a three-phase PWM converter system which is another embodiment of the present invention.

Next, a three-phase PWM converter system connected to a three-phase AC power source, which is an embodiment of the present invention, will be described with reference to FIG. 7. In FIG. 7, the alternating current power, which is supplied to a three-phase converter 3b from a three-phase AC power source 1b via an AC reactor 2, is converted to the direct current power by a three-phase converter 3b and then supplied to a smoothing capacitor 4 and a load 5. Further, a control circuit consists of power supply voltage phase detecting means 6, current detecting means 7b, and a three-phase converter control computing unit 8b. The current detecting means 7b which is the main part of this embodiment detects the input current waveform of the converter based on gate signals and an output signal of a direct current detector 9 and outputs the values as ia and ib.

A converter control computing unit 8b inputs ia and ib which are output from a current detecting part. Based on those values, voltage vector signals Veca and Vecb, and power supply voltage phase θr, an Id/Iq computing unit 22 then calculates a ineffective current Id and an effective current Iq of a power supply current.

A converter controller outputs an effective current command Iq* of a power supply current (i.e. input current of a converter) so that Vdc agrees with Vdc*. Further, a power supply current controller 13b outputs three-phase voltage commands Vu*, Vv*, and Vw* so that the detected value Iq agrees with an effective current command Iq* and a ineffective current Id equals 0. Based on this, PWM gate signal generating means 14b outputs gate signals U, V, W, X, Y, and Z.

Figure 8:
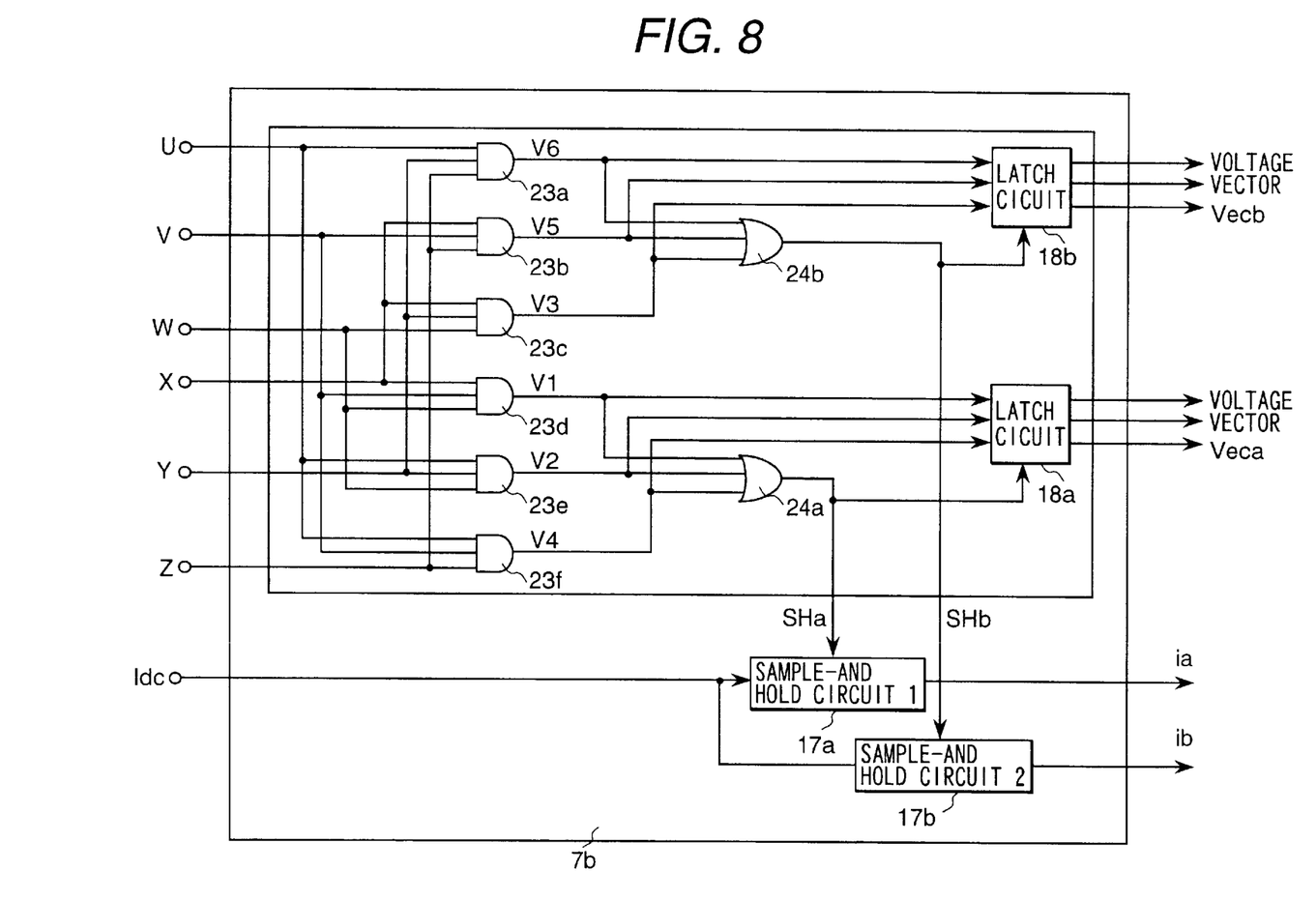
FIG. 8 is a detailed circuit diagram of a current detecting part 7b shown in FIG. 7.

A detailed circuit diagram of current detecting means 7b which is the main part of this embodiment is shown in FIG. 8. AND circuits 23 detect six types of gate conditions and then an adder 24a adds all signals in the state wherein one phase of gate signals of an inverter's negative arm is ON (i.e. X,Y,Z equals 1,0,0, X,Y,Z equals 0,1,0, and X,Y,Z equals 0,0,1) to obtain a sample-and-hold signal SHa. Further, a direct current idc when SHa equals 1 is sampled and held by a sample-and-hold circuit 17a and is output as ia.

Furthermore, an adder 24b adds all signals in the state wherein two phases of gate signals of an inverter's negative arm are ON (i.e. X,Y,Z equals 1,1,0, X,Y,Z equals 0,1,1, and X,Y,Z equals 1,0,1) to obtain a sample-and-hold signal SHb. Moreover, a direct current idc when SHb equals 1 is sampled and held by a sample-and-hold circuit 17b and is output as ib. A latch circuit 18a latches a voltage vector in the state where SHa equals 1 and outputs as Veca. On the other hand, a latch circuit 18b latches a voltage vector in the state where SHb equals 1 and outputs as Vecb.

Figure 9:
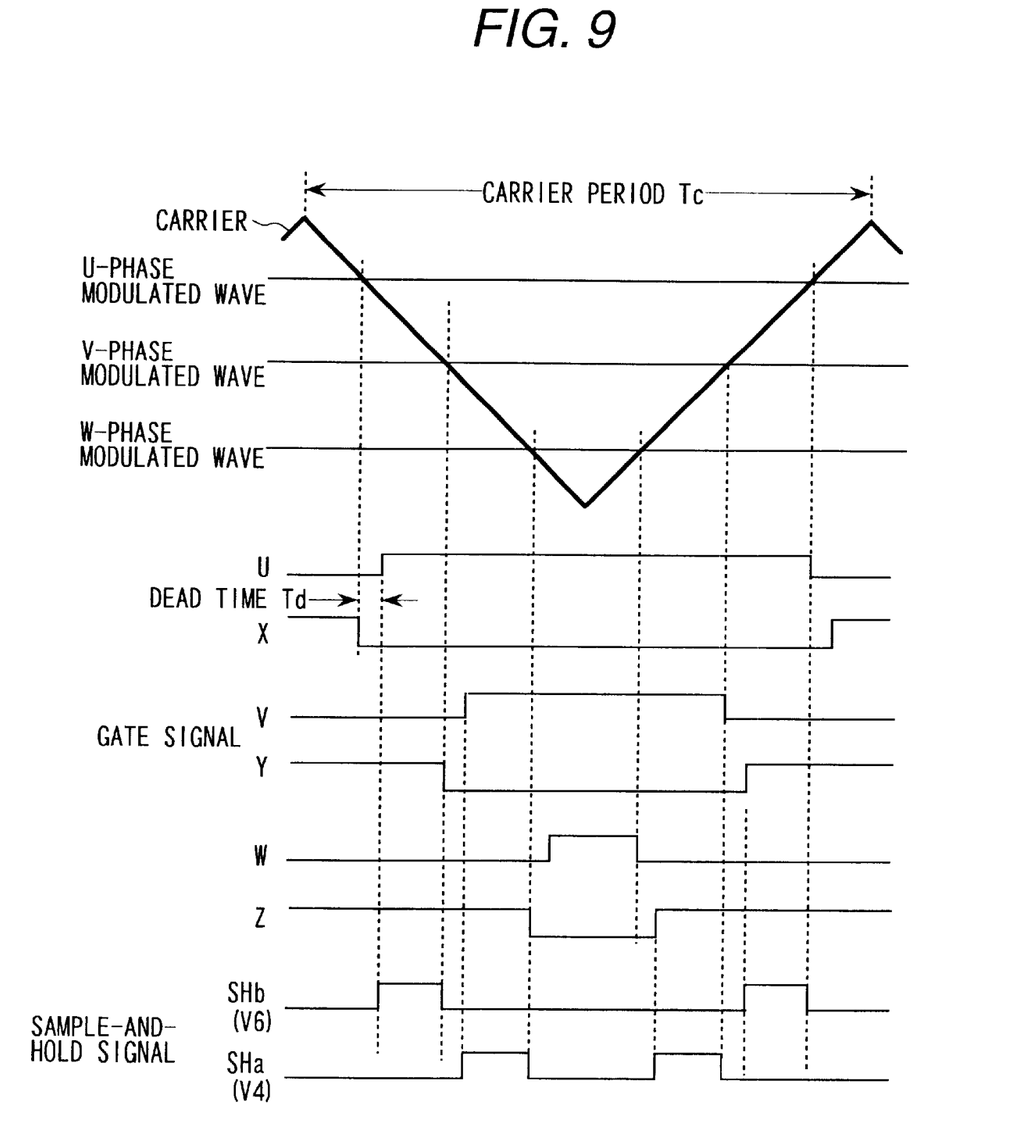
FIG. 9 is a timing chart of a current detecting part 7b shown in FIG. 8.

A timing chart of three-phase current detecting means 7b shown in FIG. 8 is specifically shown in FIG. 9. FIG. 9 indicates the state where a U-phase modulated wave corresponding to a U-phase voltage command is the largest, a V-phase modulated wave is second largest, and a W-phase modulated wave is the smallest. A gate condition wherein two of three-phase gate signals X, Y and Z are ON excluding the dead time section is output as a SHb signal and a condition wherein only one phase of the gate signals is ON is output as a SHa signal.

Figure 10:
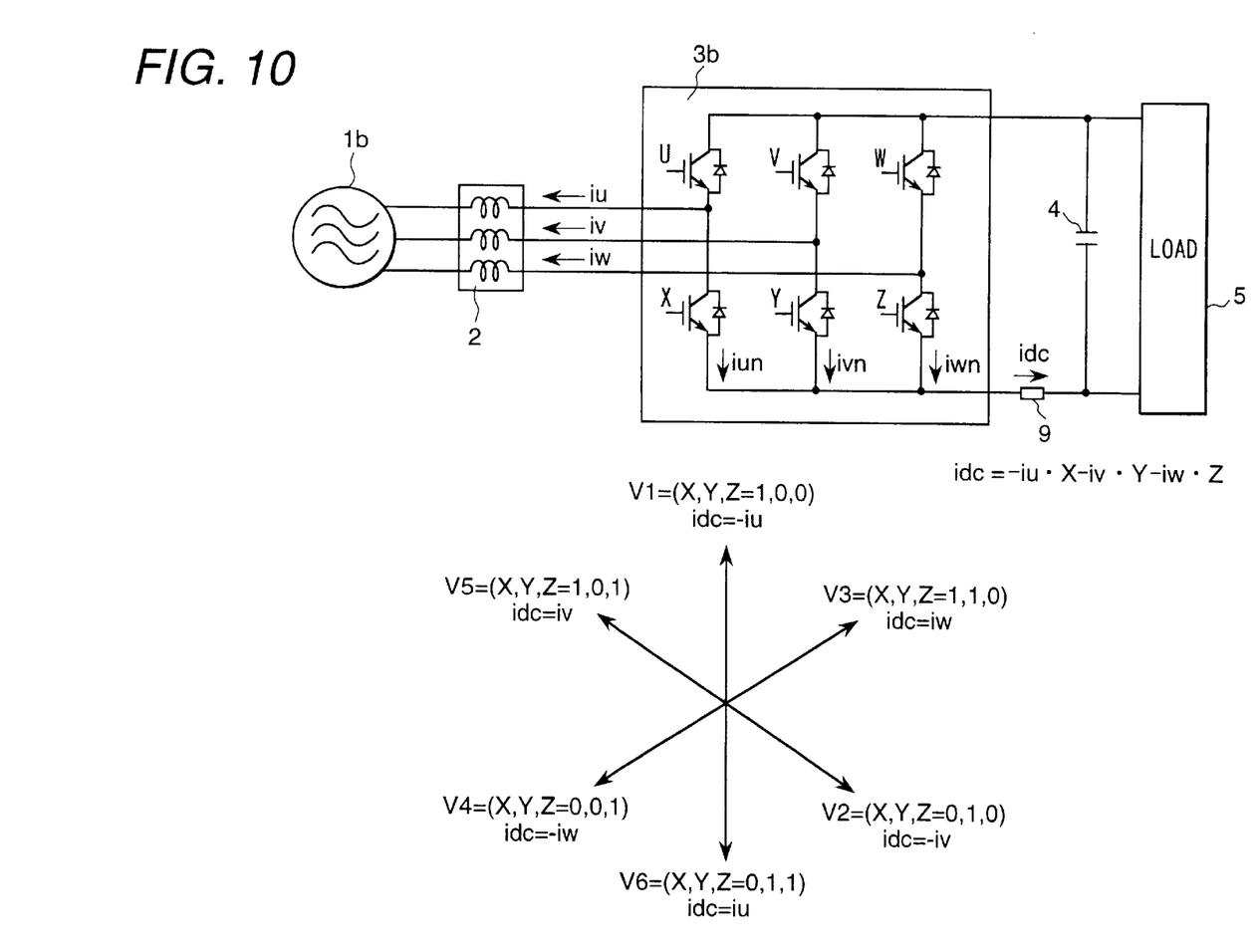
FIG. 10 is an explanatory drawing that shows the relationship between a direct current at the output side of a three-phase converter and an alternating current at the input side of a three-phase converter.

Next, power supply current components contained in a direct current idc will be explained with reference to FIG. 10. A three-phase converter 3b consists of six switching elements and six reflux diodes. A direct current idc is expressed by Equation 3 according to FIG. 10.

$$idc = iun + ivn + iwn = -iu \cdot X - iv \cdot Y - iw \cdot Z \qquad \text{<Equation 3>}$$

where iu, iv, and iw are input side currents of each phase of the converter, and a gate signal X, Y or Z is 1 when it is ON and 0 when it is OFF. Further, according to Equation 3, when X,Y,Z equals 0,0,0, idc equals 0. Furthermore, when X,Y,Z equals 1,1,1, idc equals 0 because the addition of three-phase power supply currents is 0. Accordingly, there are six types of gate conditions wherein a current flows through idc as shown in FIG. 10. The relationship between idc and the power supply current is determined according to the gate condition.

Figure 11:
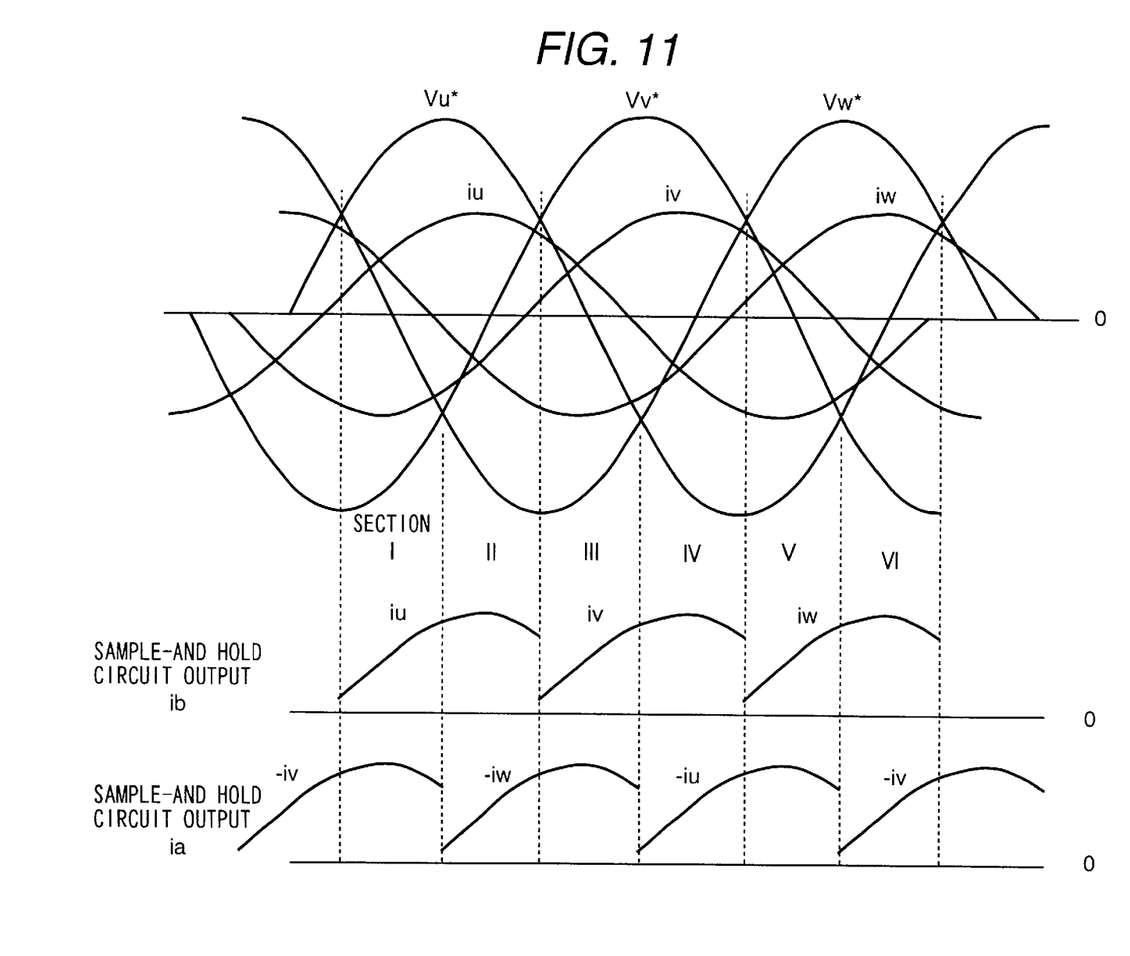
FIG. 11 is an output waveform chart of sample-and-hold circuits 17a and 17b shown in FIG. 8.
Figure 12:
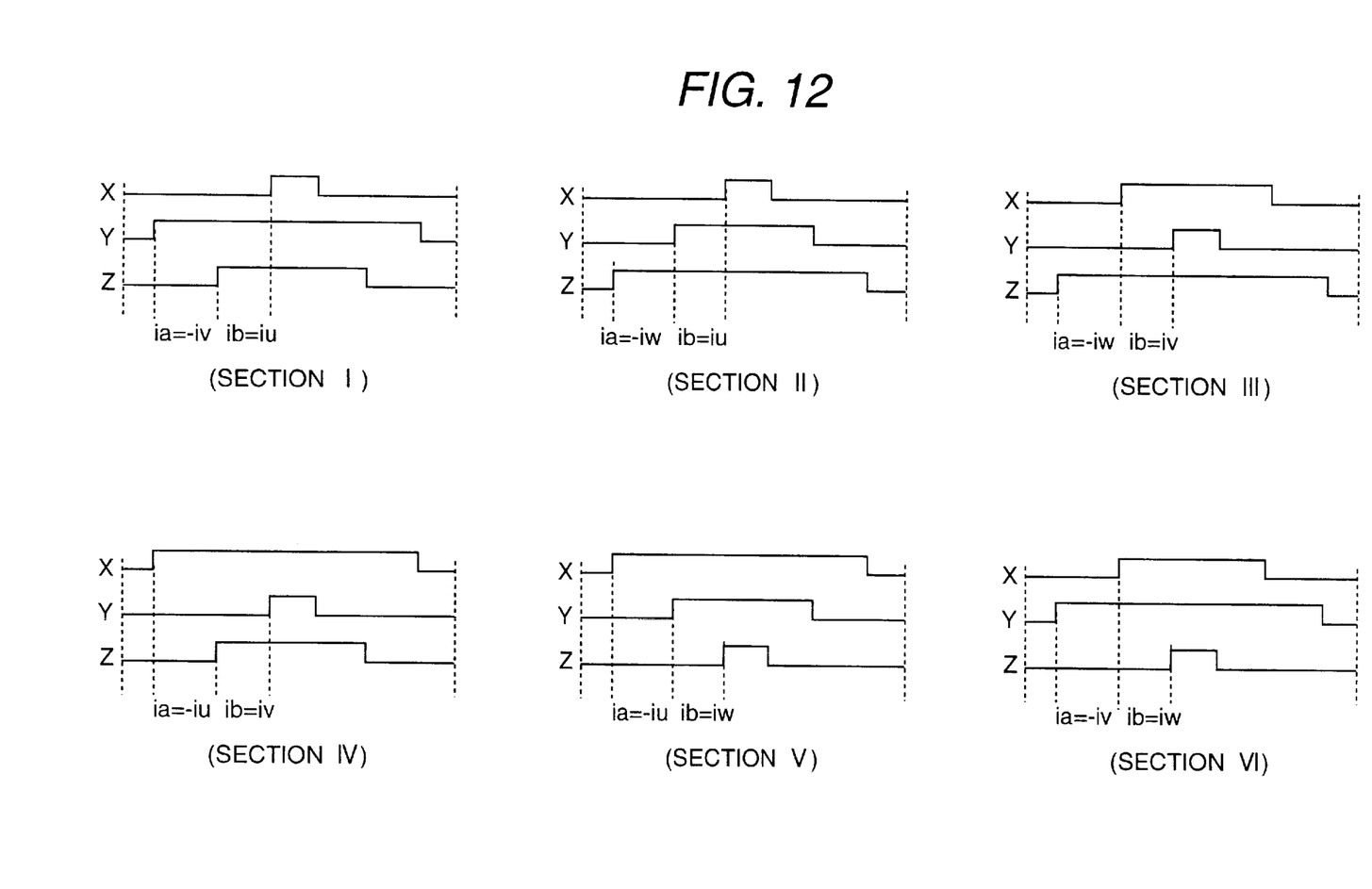
FIG. 12 is a gate signal waveform chart of each 60 degree section shown in FIG. 11.

Now, outputs ia and ib of sample-and-hold circuits will be explained with reference to FIG. 11. FIG. 11 shows the waveform at a time when the current phase at the input side of the converter is slightly delayed from the voltage phase at the input side of the converter. In controlling a PWM converter, the voltage phase at the input side of the converter is almost same as the voltage phase of the power supply. Therefore, the waveform shown in FIG. 11 is the waveform at the time of power regeneration when a current is supplied from the load side to the power source side. If the numbers from I to VI are assigned to each 60 degree section wherein three-phase AC voltage commands Vu*, Vv* and Vw* intersect, the gate signal waveform in each 60 degree section appears as shown in FIG. 12. When one of X, Y, or Z is ON, a sample-and-hold circuit 17a samples and holds idc and outputs the value as ia. When two phases are ON, a sample-and-hold circuit 17b samples and holds idc and outputs the value as ib. Further, idc at that point is expressed by Equation 3. Values of ia and ib in each gate condition are shown in FIG. 12. If the values are expressed by a period of output voltage of an inverter, the waveform of ia and ib appears as shown in the bottom of FIG. 11. That is to say, a current of the highest voltage phase among three phase voltages is periodically output as a value of ib. Furthermore, an inverted sign value of a current of the lowest voltage phase is output as a value of ia. Consequently, ia and ib are output 60 degrees out of phase with each other.

Next, overcurrent protection will be explained. According to FIG. 11, in the control for sustaining power factor of power supply at nearly 1 or −1, the maximum value of the instantaneous current of each phase is periodically output as ia or ib. For example, in FIG. 11, iv whose instantaneous current amplitude is the largest in Section I is output as ia (i.e. ia equals −iv). Further, iu which is the largest in Section II is output as ib. That is to say, the maximum value of the instantaneous current of three phases is output as ia or ib. Accordingly, when ia or ib exceeds a predetermined overcurrent level due to overload or some other reasons, this embodiment blocks all gate signals of the converter and functions as a diode rectifier. Furthermore, it sends an overcurrent signal to the load side to stop operation thereof. As a consequence, this embodiment can quickly protect the converter system or the device on the load side when an overcurrent occurs due to overload or some other reasons.

Now, a method of detecting an effective current Iq and a ineffective current Id of the power supply current will be described. The 60 degree Sections I to VI shown in FIG. 11 are identified and then Iq and Id are obtained by calculating Equation 4.

(Section I)

$i\alpha = -ia$ $i\beta = (ia - 2ib)/\sqrt{3}$ $Id = i\alpha \cdot \cos(\theta d^* - 2\pi/3) + i\beta \cdot \sin(\theta d^* - 2\pi/3)$ $Iq = i\alpha \cdot \sin(\theta d^* - 2\pi/3) + i\beta \cdot \cos(\theta d^* - 2\pi/3)$ <Equation 4>

(Section II)

$i\alpha = ib$ $i\beta = (2ia - ib)/\sqrt{3}$ $Id = i\alpha \cdot \cos \theta d^* + i\beta \cdot \sin \theta d^*$ $Iq = i\alpha \cdot \sin \theta d^* + i\beta \cdot \cos \theta d^*$ (Section III)

$i\alpha = -ia$ $i\beta = (ia - 2ib)/\sqrt{3}$ $Id = i\alpha \cdot \cos(\theta d^* - 4\pi/3) + i\beta \cdot \sin(\theta d^* - 4\pi/3)$ $Iq = i\alpha \cdot \sin(\theta d^* - 4\pi/3) + i\beta \cdot \cos(\theta d^* - 4\pi/3)$ (Section IV)

$i\alpha = ib$ $i\beta = (2ia - ib)/\sqrt{3}$ $Id = i\alpha \cdot \cos(\theta d^* - 2\pi/3) + i\beta \cdot \sin(\theta d^* - 2\pi/3)$ $Iq = i\alpha \cdot \sin(\theta d^* - 2\pi/3) + i\beta \cdot \cos(\theta d^* - 2\pi/3)$ (Section V)

$i\alpha = -ia$ $i\beta = (ia - 2ib)/\sqrt{3}$ $Id = i\alpha \cdot \cos \theta d^* + i\beta \cdot \sin \theta d^*$ $Iq = i\alpha \cdot \sin \theta d^* + i\beta \cdot \cos \theta d^*$ (Section VI)

$i\alpha = ib$ $i\beta = (2ia - ib)/\sqrt{3}$ $Id = i\alpha \cdot \cos(\theta d^* - 4\pi/3) + i\beta \cdot \sin(\theta d^* - 4\pi/3)$ $Iq = i\alpha \cdot \sin(\theta d^* - 4\pi/3) + i\beta \cdot \cos(\theta d^* - 4\pi/3)$ Here, if the detected value of the power supply voltage phase is θr, a reference phase command θd* equals θr−π/2. Further, ia is an output of a sample-and-hold circuit 17a and ib is an output of a sample-and-hold circuit 17b.

Moreover, the 60 degree Sections I to VI expressed by Equation 4 are identified by Veca and Vecb which are outputs of a latch circuit shown in FIG. 8. For example, when a gate condition in a given section is as shown in FIG. 12, and Veca indicates that X,Y,Z equals 0,1,0, and Vecb indicates that X,Y,Z equals 0,1,1, the section is identified as Section I.

Figure 13:
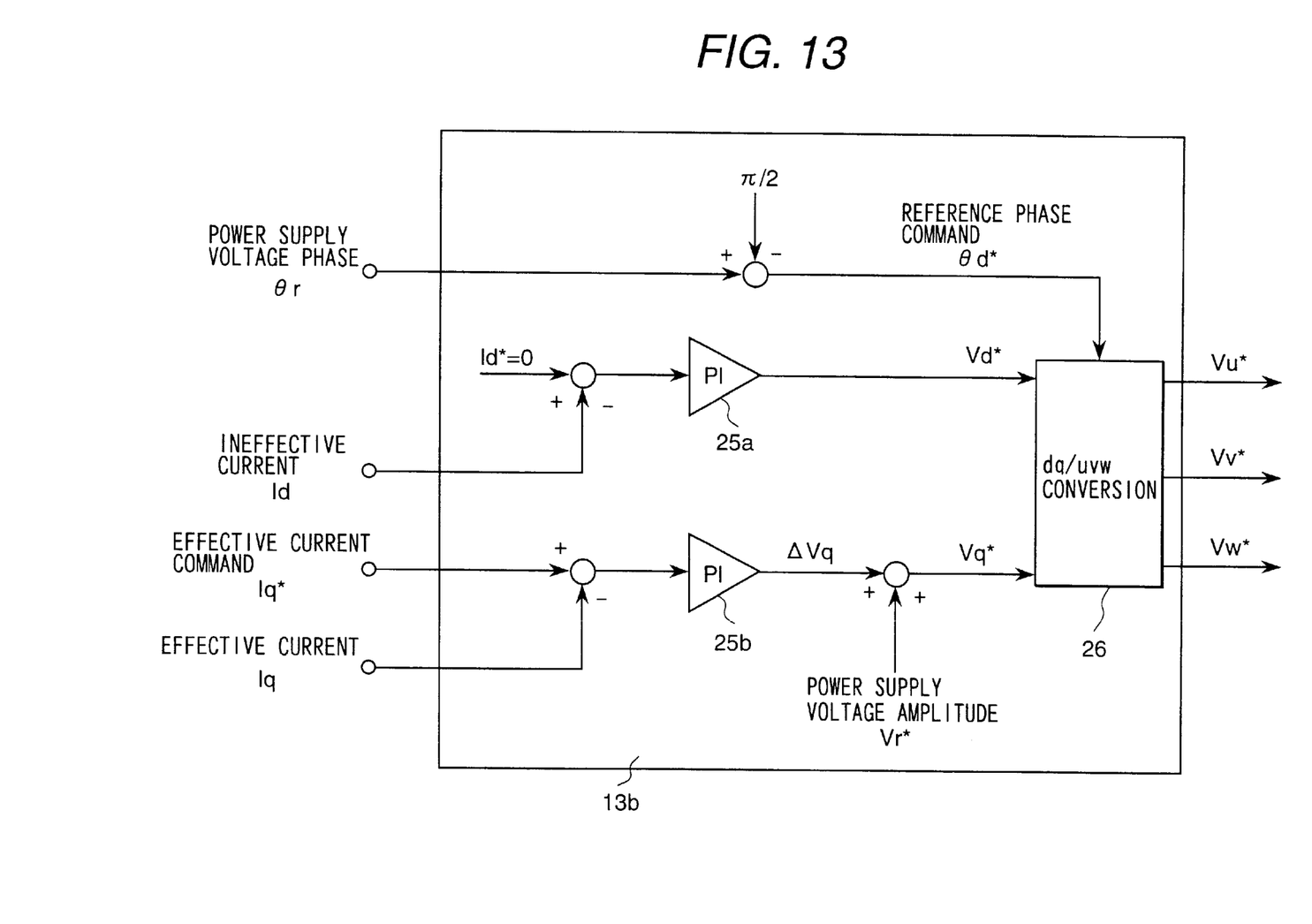
FIG. 13 is a detailed block diagram of power supply current control means 13b shown in FIG. 7.

Next, a detailed block diagram of a power supply current controller 13b is shown in FIG. 13. A proportion+integral compensating part 25a compensates for a ineffective current Id to become 0 and outputs the value as a d-axis voltage command vd*. On the other hand, as to a q-axis, a proportion+integral compensating part 25b compensates for the detected value Iq to agree with Iq* and adds the output ΔVq to a power supply voltage amplitude command value Vr* so as to obtain a q-axis voltage command Vq*. Further, a dq/uvw converter 26 calculates voltage commands Vd* and Vq* of the rotary coordinate axis by Equation 5 and then outputs the values as three-phase voltage commands Vu*, Vv* and Vw* of the alternating current on the fixed coordinates.

$Vu^* = Vd^* \cdot \cos \theta d^* - Vq^* \cdot \sin \theta d^*$ $Vw^* = -Vu^*/2 - \sqrt{3}(Vd^* \cdot \sin \theta d^* + Vq^* \cdot \cos \theta d^*)/2$ $Vv^* = -(Vu^* + Vw^*)$ <Equation 5>

As described above, this embodiment of the present invention can calculate power supply currents Iq and Id from a direct current, thereby controlling a PMW converter based on the values so that the sine wave power supply current whose power factor of power supply is 1 and which has small harmonic currents is provided. Consequently, sensors for two phases at the input side of the converter are not necessary, reducing the cost and the size of the converter system.

According to the present invention, it is possible to calculate an input current of a converter, effective current and ineffective current thereby controlling a PMW converter based on the values. As a result, the sensor at the input side of the converter is not necessary, realizing an economical converter system and reducing the size of the converter system.

Furthermore, if an output of a sample-and-hold circuit exceeds a predetermined overcurrent level, the present invention blocks gate signals of a converter, protecting the converter system from overcurrent.

What is claimed is:

1. A PWM converter system having a PWM converter, an input side being connected to an AC power source via an AC reactor or a transformer and output side DC terminals being connected to a smoothing capacitor therebetween, for converting the alternating current to the direct current, and a controller therefor, said controller including
a current detecting part which outputs the phase current waveform at the input side of said PWM converter based on an output direct current of said PWM converter, and
a computing unit which performs operations to control said PWM converter based on said current waveform,
said current detecting part receiving a direct current output current of said converter and a gate signal of said PWM converter for outputting a converter input current waveform signal (ic), and inputting said converter input current waveform signal to said computing unit.

2. A PWM converter system as claimed in claim 1, wherein said current detecting part comprises a sample-and-hold circuit which samples and holds an output direct current of a converter in the state wherein one of two phases of a positive or negative side arm switching element of a single-phase PWM converter is ON and the other phase is OFF.

3. A PWM converter system as claimed in claim 1, wherein said current detecting part comprises a sample-and-hold circuit which samples and holds an output direct current of a converter in the state wherein one of two phases of a positive or negative side arm switching element of a single-phase PWM converter is ON and the other phase is OFF, and means for controlling an AC input voltage of the converter in response to an output of said sample-and-hold circuit.

4. A PWM converter system as claimed in claim 1, wherein said current detecting part comprises a sample-and-hold circuit which samples and holds an output direct current of a converter in the state wherein one of two phases of a positive or negative side arm switching element of a single-phase PWM converter is ON and the other phase is OFF, and means for detecting a current at the input side of the converter based on the output of said sample-and-hold circuit and said gate condition and controlling an AC input voltage of the converter in response to the detected current value.

5. A PWM converter system according to any one of claims 2 through 4, wherein the current waveform output by said sample-and-hold circuit changes with a period of 180 degrees of an AC voltage of the converter.

6. A PWM converter system as claimed in claim 3 or 4, wherein said controller further comprises means or blocking all gate signals of the converter when an output of said sample-and-hold circuit exceeds a predetermined overcurrent level.

7. A PWM converter system as claimed in claim 1, herein said current detecting part comprises a first sample-and-hold circuit which samples and holds an output direct current of a converter in the state wherein one of three phases of a positive or negative side arm switching element of a three-phase PWM converter is ON and the other two phases are OFF, and a second sample-and-hold circuit which samples and holds an output direct current of the converter in the state wherein two phases are ON and the other phase is OFF.

8. A PWM converter system as claimed in claim 1, wherein said current detecting part comprises a first sample-and-hold circuit which samples and holds an output direct current of a converter in the state wherein one of three phases of a positive or negative side arm switching element of a three-phase PWM converter is ON and the other two phases are OFF, a second sample-and-hold circuit which samples and holds an output direct current of the converter in the state wherein two phases are ON and the other phase is OFF, and means for controlling an AC input voltage of the converter in response to an output of said sample-and-hold circuit.

9. A PWM converter system as claimed in claim 1, wherein said current detecting part comprises a first sample-and-hold circuit which samples and holds an output direct current of a converter in the state wherein one of three phases of a positive or negative side arm switching element of a three-phase PWM converter is ON and the other two phases are OFF, a second sample-and-hold circuit which samples and holds an output direct current of the converter in the state wherein two phases are ON and the other phase is OFF; and said controller comprises means for calculating the effective current and the ineffective current of a power supply current based on the detected value of the power supply voltage phase and the output of said sample-and-hold circuit, and means for controlling an AC input voltage of the converter in response to the calculated values of said effective current and said ineffective current.

10. A PWM converter system according to any one of claims 7 through 9, wherein the current waveform output by said sample-and-hold circuit changes with a period of 120 degrees of an AC input voltage of the converter.

11. A PWM converter system as claimed in claim 8 or 9, wherein said controller further comprises means for blocking all gate signals of the converter when an output of said sample-and-hold circuit exceeds a predetermined overcurrent level.

* * * * *